(12) United States Patent
Su

(10) Patent No.: US 7,796,688 B2
(45) Date of Patent: Sep. 14, 2010

(54) RADIO RECEIVER HAVING A CHANNEL EQUALIZER AND METHOD THEREFOR

(75) Inventor: Jie Su, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 710 days.

(21) Appl. No.: 11/751,771

(22) Filed: May 22, 2007

(65) Prior Publication Data

US 2008/0291991 A1 Nov. 27, 2008

(51) Int. Cl.
*H03H 7/30* (2006.01)
*H04B 1/10* (2006.01)
(52) U.S. Cl. ........................................ 375/232; 375/350
(58) Field of Classification Search ......... 375/232–236, 375/350
See application file for complete search history.

(56) References Cited

U.S. PATENT DOCUMENTS

| 5,311,546 | A | | 5/1994 | Paik et al. | |
|---|---|---|---|---|---|
| 5,506,871 | A | | 4/1996 | Hwang et al. | |
| 5,872,815 | A | * | 2/1999 | Strolle et al. | 375/321 |
| 6,088,389 | A | * | 7/2000 | Larsson | 375/231 |
| 6,178,201 | B1 | * | 1/2001 | Hillery | 375/232 |
| 6,668,014 | B1 | | 12/2003 | Endres et al. | |
| 6,993,311 | B2 | | 1/2006 | Li et al. | |
| 2005/0157820 | A1 | * | 7/2005 | Wongwirawat et al. | 375/326 |
| 2005/0181741 | A1 | * | 8/2005 | Raj et al. | 455/73 |
| 2007/0030932 | A1 | | 2/2007 | Su et al. | |

OTHER PUBLICATIONS

Treichler et al; "The Tone Capture Properties of CMA-Based Interference Suppressors"; IEEE Transactions on Acoustics, Speech, and Signal Processing, vol. Assp-33, No. 4, Aug. 1985.

* cited by examiner

*Primary Examiner*—Don N Vo
(74) *Attorney, Agent, or Firm*—Daniel D. Hill

(57) ABSTRACT

A radio receiver for receiving a signal is provided. The radio receiver comprises an equalizer configured to perform a constant modulus algorithm initialized using a first set of coefficients on the received signal and for generating an equalized signal. The radio receiver further comprises a demodulator coupled to the equalizer for demodulating the equalized signal. The radio receiver further comprises a lowpass filter coupled to the demodulator for lowpass filtering the demodulated signal to detect a spurious signal and to generate an offset signal. The radio receiver further comprises a coefficient generator coupled to the lowpass filter and configured to compare the offset signal to a predetermined threshold, and if the offset signal satisfies a predetermined condition in relation to the predetermined threshold, then to generate a second set of coefficients for re-initializing the constant modulus algorithm.

18 Claims, 3 Drawing Sheets

RADIO RECEIVER HAVING A CHANNEL EQUALIZER AND METHOD THEREFOR

BACKGROUND

1. Field

This disclosure relates generally to radio, and more specifically, to a radio receiver having a channel equalizer and method therefor.

2. Related Art

A constant modulus algorithm (CMA) is commonly used to provide a channel equalizer function in a digital FM (frequency modulation) receiver. The channel equalizer is used to correct or mitigate the effects of multi-path noise or adjacent channel interference. However, in some cases, the CMA can cause unintended effects in the FM receiver. For example, single-frequency tones (spurs) may be generated within the frequency band of interest by defects in an RF (radio frequency) front-end. Also, spurs may be generated by the switching of an operating class D digital amplifier. If the spurs have a greater amplitude than the desired FM signal (signal-of-interest or SOI), the CMA based channel equalizer may lock onto the spurs while suppressing the SOI.

Therefore, it would be desirable to have an FM radio receiver that removes the spurs while still having the ability to equalize a relatively wide band SOI.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect there is provided, a radio receiver for receiving a signal, the radio receiver comprises an equalizer, a demodulator, a lowpass filter, and a coefficient generator. The equalizer is configured to perform a constant modulus algorithm initialized using a first set of coefficients on the received signal and for generating an equalized signal. The demodulator is coupled to the equalizer for demodulating the equalized signal. The lowpass filter is coupled to the demodulator for lowpass filtering the demodulated signal to detect a spurious signal and to generate an offset signal. The coefficient generator is coupled to the lowpass filter and configured to compare the offset signal to a predetermined threshold, and if the offset signal satisfies a predetermined condition in relation to the predetermined threshold, then to generate a second set of coefficients for re-initializing the constant modulus algorithm.

In another aspect, a radio receiver is provided for receiving a signal that comprises: an equalizer, a demodulator, a lowpass filter, and a coefficient generator. The equalizer is configured to perform a constant modulus algorithm initialized using a first set of coefficients on the received signal and for generating an equalized signal. The demodulator is coupled to the equalizer for demodulating the equalized signal. The lowpass filter is coupled to the demodulator for lowpass filtering the demodulated signal to detect a spurious signal and to generate an offset signal. The coefficient generator is coupled to the lowpass filter and configured to compare the offset signal to a predetermined threshold, and if the offset signal satisfies a predetermined condition in relation to the predetermined threshold, then to generate a second set of coefficients for re-initializing the constant modulus algorithm, wherein the second set of coefficients for the constant modulus algorithm are generated based on a frequency of the spurious signal and a set of coefficients related to a predetermined prototype filter.

In yet another aspect, there is provided a method in a radio receiver for receiving a signal, where the method comprises: performing a constant modulus algorithm initialized using a first set of coefficients on the received signal to generate an equalized signal; demodulating the equalized signal; filtering the demodulated signal to detect a spurious signal and to generate an offset signal; and comparing the offset signal to a predetermined threshold, and if the offset signal satisfies a predetermined condition in relation to the predetermined threshold, then generating a second set of coefficients for re-initializing the constant modulus algorithm.

Figure 1:
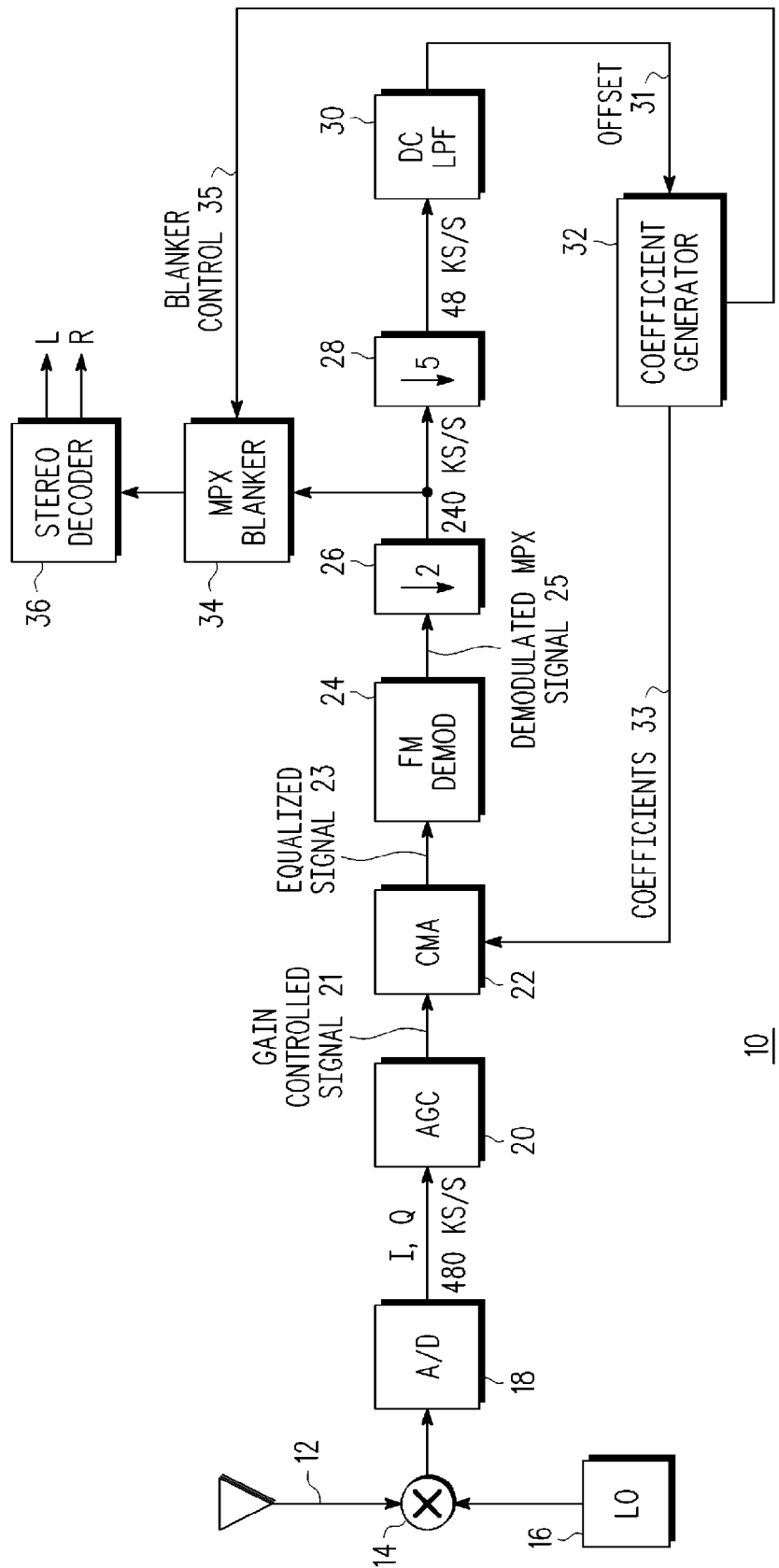
FIG. 1 illustrates an FM receiver in accordance with one embodiment.

FIG. 1 illustrates an FM receiver 10 in accordance with one embodiment. FM receiver 10 includes antenna 12, mixer 14, local oscillator 16, analog-to-digital (A/D) converter 18, automatic gain control (AGC) circuit 20, constant modulus algorithm (CMA) channel equalizer 22, FM demodulator 24, down sampler 26, down sampler 28, Direct current (DC) lowpass filter (LPF) 30, coefficient generator 32, multiplex (MPX) blanker 34, and stereo decoder 36.

Antenna 12 is coupled to a first input of mixer 14. Mixer 14 has a second input coupled to a local oscillator 16 for receiving a local oscillator signal, and an output coupled the input of A/D converter 18. The mixer 14 and local oscillator 16 are used to convert radio frequency (RF) signals from antenna 12 to FM signals in an intermediate frequency (IF) band of about 10.8 MHz. In other embodiments the IF may be different. The antenna 12, mixer 14, and local oscillator 16 are part of a receiver portion known as a "front-end". There are other parts of the front-end that are not illustrated in FIG. 1. For example, the front-end may have circuits that amplify and broadband filter the received FM signals. Also, in other embodiments there may be more than one antenna connected to mixer 14. Also, a switch (not shown) may be connected between the antenna 12 and mixer 14 in other embodiments. RF front-end design is known in the art and will not be further described. A/D converter 18 converts the analog output signal of the front-end circuit to a digital signal and moves the FM signals from the IF frequency to a base band frequency.

A/D converter 18 has an output coupled to an input of AGC circuit 20 for providing I and Q quadature signals at a sample rate of 480 kilo samples per second (KS/s). The AGC circuit 20 then provides a gain controlled signal labeled "GAIN CONTROLLED SIGNAL 21" to CMA equalizer 22. CMA equalizer 22 has an output for providing a constant modulus signal labeled "EQUALIZED SIGNALS 23" to FM demodulator 24. The CMA equalizer performs an equalization on the gain controlled signal 21 to produce equalized signals 23 having a relatively constant amplitude. FM demodulator 24 has an output for providing demodulated MPX signals 25 (DEMODULATED MPX SIGNAL 25) to down sampler 26. Down sampler 26 down samples demodulated MPX signals 25 by two to reduce the sample rate to 240 KS/s. The down sampled signals are then provided to MPX blanker 34 and to down sampler 28. Down sampler 28 down samples by five and has an output for providing a down sampled signal at a sample rate of 48 KS/s. Note that in other embodiments the "sample rates may be different. DC (direct current) LPF 30 has an input coupled to the output of down sampler 28, and an output for providing an offset signal labeled "OFFSET 31" to an input of coefficient generator 32. The DC LPF 30 receives the demodulated and down sampled signal from down sampler 28 and provides the offset signal 31 as a DC signal having a voltage corresponding to the frequency of a detected spur. MPX blanker 34 has an output coupled to an input of stereo decoder 36. Stereo decoder 36 has left and right outputs labeled "L" and "R", respectively, for providing a stereo audio signal corresponding to the received FM signal. Coefficient generator 32 has a first output for providing COEFFICIENTS 33 to a control input of CMA equalizer 22, and a second output for providing a control signal labeled "BLANKER CONTROL 35" to a control input of MPX blanker 34.

Figure 2:
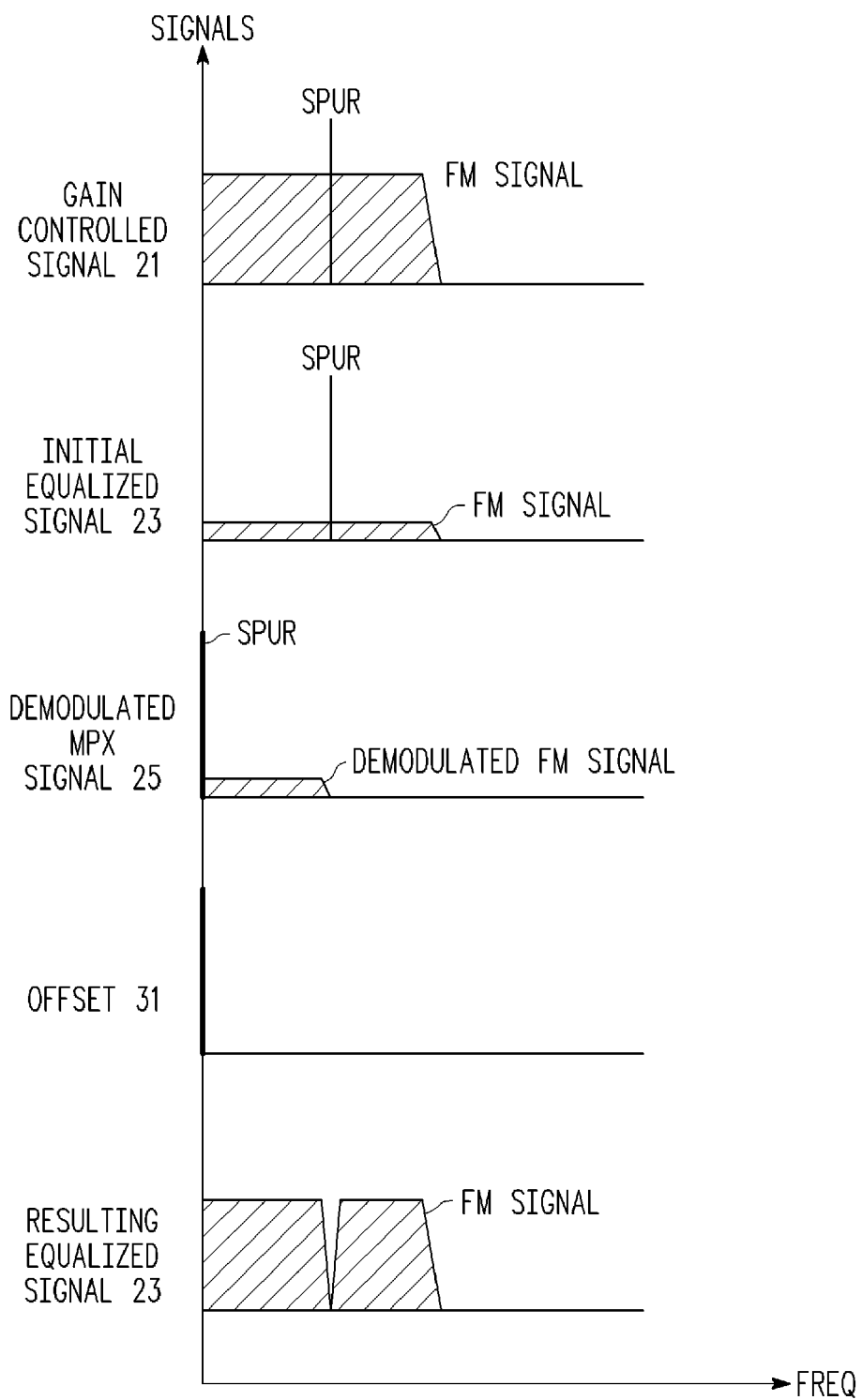
FIG. 2 illustrates various signals of the FM receiver of FIG. 1.

FIG. 2 illustrates various signals of the receiver 10 of FIG. 1 in the frequency domain useful for understanding the illustrated embodiment. The operation of receiver 10 will be discussed referring to FIGS. 1 and 2. In operation, the receiver 10 is tuned to a predetermined frequency, or station, and an FM signal is received and processed by antenna 12, mixer 14, local oscillator 16 and A/D converter 18 to produce quadrature signals I and Q. The I and Q signals are processed by AGC 20 to change the signal to produce gain controlled signal 21 having a relatively fixed signal strength. Due to unintended effects of, for example, the receiver front-end circuits, one or more spurs may be generated with the FM signal that appear as a single tone signal in the frequency band of interest in the GAIN CONTROLLED SIGNAL 21 of AGC 20 as illustrated in FIG. 2. In accordance with the illustrated embodiment, CMA equalizer 22 is used to equalize the amplitude of the gain controlled signal 21 including the spur. As illustrated in FIG. 2, the CMA equalizer 22 is initialized by a first set of coefficients, which normally represents an all pass filter, to detect and lock onto the spur and attenuate the FM signal to produce an initial EQUALIZED SIGNAL 23. The initial EQUALIZED SIGNAL 23 is demodulated to produce DEMODULATED MPX SIGNAL 25. The demodulated signal 25 includes the spur and the demodulated FM signal. The spur is moved to DC and the frequency band of the FM demodulated signal is reduced by demodulator 24 as illustrated in FIG. 2. In other embodiments, the frequency band of demodulated signal 25 may be unchanged. After being down sampled by down samplers 26 and 28, the demodulated FM signal and spur are provided to DC LPF 30. DC LPF 30 removes substantially the entire demodulated FM signal leaving only the DC voltage from the spur as voltage OFFSET 31. OFFSET 31 is provided to coefficient generator 32. If the spur voltage OFFSET 31 is higher than a predetermined threshold, then the following equation is used to determine a second set of equalizer coefficients to re-initialize the CMA and remove the spur.

$$\text{Coefficients}_{new} = \text{Coefficients}_{prototype} * e^{i*2\pi*(f_{spur}-f_{notch})/F_s*K}$$

Generally, the second set of coefficients causes the CMA equalizer 22 to create a notch in the frequency band of the FM signal at the frequency of the spur. The notch effectively removes the spurious single frequency signal. In the above equation $f_{spur}$ is the corresponding frequency for spur voltage OFFSET 31, $F_S$ is the sample rate, and K is an array of real integer numbers from 1 to the number of equalizer taps. Coefficients$_{prototype}$ is a set of coefficients related to a predetermined prototype filter having a notch at a notch frequency of $f_{notch}$. In the illustrated embodiment, $f_{notch}$ is 50 KHz. A frequency different than 50 KHz may be used in the above equation in other embodiments. The frequency used for $f_{notch}$ can be randomly chosen within the frequency band of interest. In a preferred embodiment, the frequency $f_{notch}$ is near the center frequency of the frequency band of interest. A prototype filter has a notch at the frequency $f_{notch}$. Using the center frequency for the prototype filter minimizes how far the prototype notch is moved to correspond to the spur frequency. Coefficients$_{new}$ is the new second set of generated coefficients. The new coefficients are then used with a proper gain factor to re-initialize CMA equalizer 22. The new coefficients are used to create a notch in the equalized signal 23 at the frequency of the spur. The RESULTING EQUALIZED SIGNAL 23 is illustrated in FIG. 2. The notch in RESULTING EQUALIZED SIGNAL 23 is at the spur frequency, thus removing the spur from the received FM signal. After being re-initialized, CMA 22 will adaptively update without re-initializing again. Also, signal BLANKER CONTROL 35 from coefficient generator 32 is used to control the MPX blanker 34 to lower a noise detection threshold associated with MPX blanker 34 if OFFSET 31 is greater than a predetermined threshold.

A spur may not be present or a spur may not be detected if the spur has an amplitude that is less than the amplitude of the FM signal. The RF function of the front-end circuits may produce a spurious signal in the IF signal for some tuned channels and not for others. If no spur is detected when the FM signal is initially received, then the CMA 22 is allowed to operate without re-initialization. That is, the above equation is not used to re-initialize the coefficients. Note that the illustrated embodiment includes an FM signal. However, in other embodiments, signals of other modulation types that are processed using a CMA may be substituted for the FM signal.

The described embodiment is intended to be implemented in software or firmware of a digital signal processor (DSP) in an integrated circuit. The FM receiver is part of a digital IF automobile radio having a CMA based channel equalizer. However, the described embodiment may be implemented as hardware or software or a combination of hardware and software. Also, the described embodiment may be used in another type of radio receiver in another environment. The described embodiment removes a detected spur from an FM signal that may be caused by, for example, defects in a receiver front-end circuit. Removing the spur as described improves audio quality of the FM signal while still allowing the channel equalizer to equalize a constant modulus SOI. In addition, the described embodiment can reduce electromagnetic interference (EMI) caused by a nearby class D amplifier.

Figure 3:
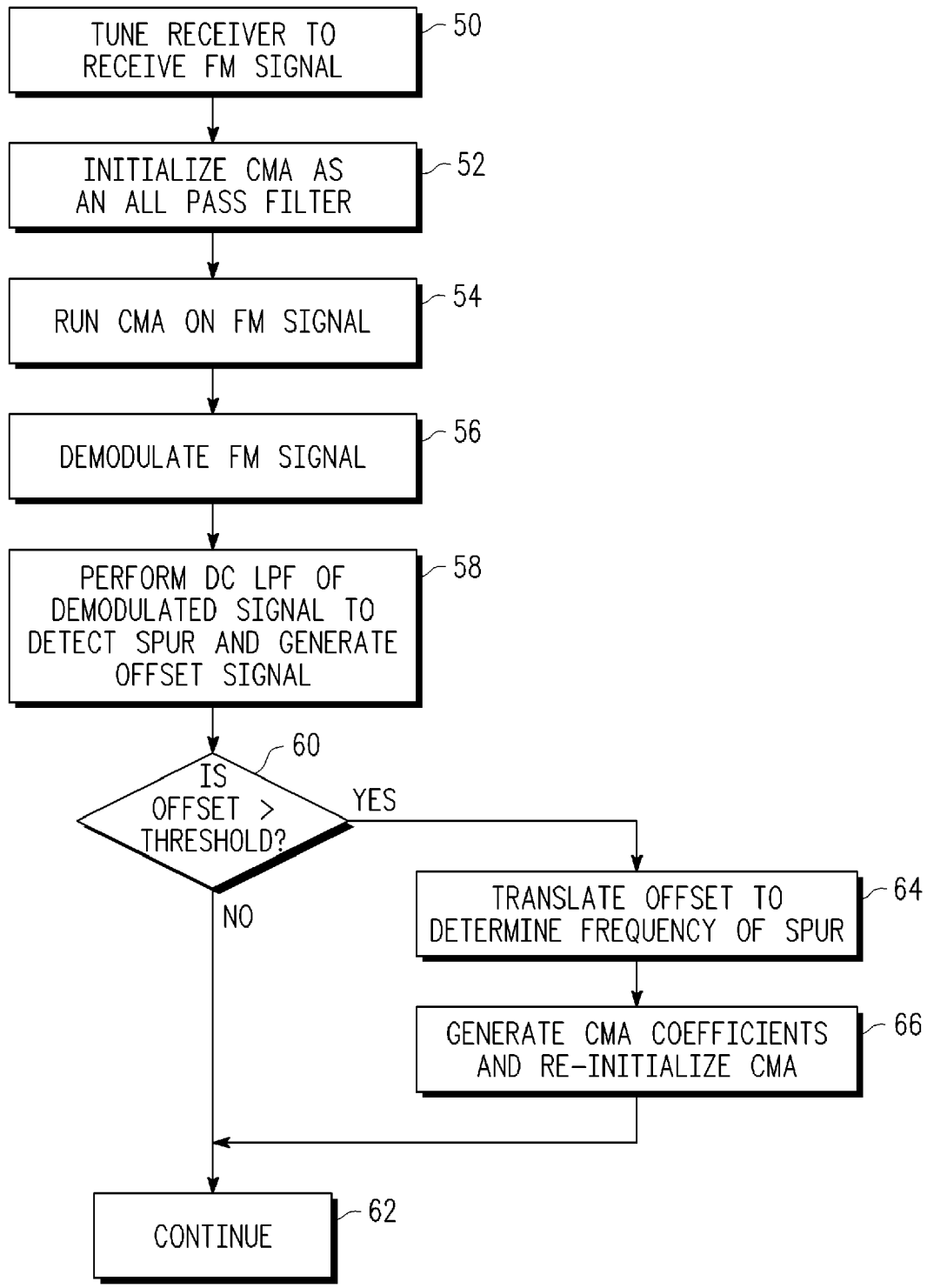
FIG. 3 illustrates a method for operating the FM receiver of FIG. 1.

FIG. 3 illustrates a method for operating the FM receiver 10 of FIG. 1. At step 50, receiver 10 is tuned to receive an FM signal. At step 52, the CMA equalizer is initialized as an all pass filter. When the FM signal is initially received and a spur is detected by the CMA equalizer 22 within the frequency band, the CMA equalizer 22 is run at step 54. The CMA equalizer 22 locks onto the spur instead of the FM signal to be equalized and removes substantially the entire FM signal. At step 56, the FM signal is demodulated using FM demodulator 24. After being down sampled by down samplers 26 and 28, DC lowpass filter 30 is used in step 58 to lowpass filter the demodulated signal, detect the spur, and generate signal OFFSET 31. At decision step 60, the signal OFFSET 31 is compared to a predetermined threshold. If OFFSET 31 is less than or equal to the threshold, then the NO path is taken to step 62, indicating no spur was detected, and CMA 22 continues to equalize the FM signal without being re-initialized by the above equation. If OFFSET 31 is greater than the threshold at decision step 60, then the YES path is taken to step 64. At step 64 OFFSET 31 is translated to determine the frequency of the spur using coefficient generator 32. Signal OFFSET 31 is translated by using a look-up table (not shown) in coefficient generator 32 to determine the frequency of the spurious signal based on OFFSET 31. In another embodiment, OFFSET 31 may be translated using a linear equation instead of a look-up table. At step 66, new COEFFICIENTS 33 are generated by coefficient generator 32 using the above equation for new coefficients and used to re-initialize CMA 22 and the method continues to step 62. Also, the BLANKER CONTROL 35 is used to control the MPX blanker 34 to lower a noise detection threshold associated with MPX blanker 34 if OFFSET 31 is greater than a predetermined threshold to remove any residual noise. The method is repeated whenever the FM receiver is tuned to a new station.

By now it should be appreciated that there has been provided a method and receiver for removing spurs from a received FM signal. The spurs are removed by generating new coefficients for a CMA equalizer. The new coefficients create a notch at the frequency of the spur. This removes the spur without affecting the rest of the bandwidth of the CMA. Also, an MPX blanker is used to remove any residual noise from the spurious signal.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The term "coupled," as used herein, is not intended to be limited to a direct coupling or a mechanical coupling.

What is claimed is:

1. A radio receiver for receiving a signal, comprising:
    an equalizer configured to perform a constant modulus algorithm initialized using a first set of coefficients on the received signal and for generating an equalized signal;
    a demodulator coupled to the equalizer for demodulating the equalized signal;
    a lowpass filter coupled to the demodulator for lowpass filtering the demodulated signal to detect a spurious signal and to generate an offset signal; and
    a coefficient generator coupled to the lowpass filter and configured to compare the offset signal to a predetermined threshold, and if the offset signal satisfies a predetermined condition in relation to the predetermined threshold, the coefficient generator determining a frequency of the spurious signal based on the offset signal, then to generate a second set of coefficients for re-initializing the constant modulus algorithm.

2. The radio receiver of claim 1, wherein the second set of coefficients for the constant modulus algorithm are generated based on a frequency of the spurious signal and a set of coefficients related to a predetermined prototype filter.

3. The radio receiver of claim 2, wherein the second set of coefficients are generated using an equation, wherein the equation comprises:

$$\text{Coefficients}_{new} = \text{Coefficients}_{prototype} * e^{i*2\pi*(f_{spur}-f_{notch})/F_s*K}$$

wherein Coefficients$_{new}$ is the second set of coefficients, Coefficients$_{prototype}$ is the set of coefficients related to the predetermined prototype filter having a notch at a notch frequency of $f_{notch}$, $f_{spur}$ is the frequency of the spurious signal, $F_s$ is a sample frequency of the equalizer, and K is an array of integer numbers from 1 to a number of taps of the equalizer.

4. The radio receiver of claim 1, wherein the coefficient generator is further configured to use a look up table to determine the frequency of the spurious signal based on the offset signal.

5. The radio receiver of claim 1, wherein the predetermined condition comprises whether the offset signal exceeds the predetermined threshold.

6. The radio receiver of claim 1 further comprising a multiplexed signal blanker and wherein the coefficient generator is configured to lower a noise detection threshold associated with the multiplexed signal blanker if the offset signal satisfies the predetermined condition.

7. The radio receiver of claim 6, wherein the predetermined condition comprises whether the offset signal exceeds the predetermined threshold.

8. A radio receiver for receiving a signal, comprising:
    an equalizer configured to perform a constant modulus algorithm initialized using a first set of coefficients on the received signal and for generating an equalized signal;
    a demodulator coupled to the equalizer for demodulating the equalized signal;
    a lowpass filter coupled to the demodulator for lowpass filtering the demodulated signal to detect a spurious signal and to generate an offset signal; and
    a coefficient generator coupled to the lowpass filter and configured to compare the offset signal to a predetermined threshold, and if the offset signal satisfies a predetermined condition in relation to the predetermined threshold, then to generate a second set of coefficients for re-initializing the constant modulus algorithm, wherein the second set of coefficients for the constant modulus algorithm are generated based on a frequency of the spurious signal and a set of coefficients related to a predetermined prototype filter.

9. The radio receiver of claim 8, wherein the coefficient generator is further configured to determine a frequency of the spurious signal based on the offset signal.

10. The radio receiver of claim 9, wherein the coefficient generator is further configured to use a look up table to determine the frequency of the spurious signal based on the offset signal.

11. The radio receiver of claim 8, wherein the predetermined condition comprises whether the offset signal exceeds the predetermined threshold.

12. The radio receiver of claim 8 further comprising a multiplex signal blanker and wherein the coefficient generator is configured to lower a noise detection threshold associated with the multiplex signal blanker if the offset signal satisfies the predetermined condition.

13. The radio receiver of claim 12, wherein the predetermined condition comprises whether the offset signal exceeds the predetermined threshold.

14. The radio receiver of claim 8, wherein the second set of coefficients are generated using an equation, wherein the equation comprises:

$$\text{Coefficients}_{new} = \text{Coefficients}_{prototype} * e^{i*2\pi*(f_{spur} - f_{notch})/F_s * K}$$

wherein $\text{Coefficients}_{new}$ is the second set of coefficients, $\text{Coefficients}_{prototype}$ is the set of coefficients related to the predetermined prototype filter having a notch at a notch frequency of $f_{notch}$, $f_{spur}$ is the frequency of the spurious signal, $F_s$ is a sample frequency of the equalizer, and K is an array of integer numbers from 1 to a number of taps of the equalizer.

15. A method in a radio receiver for receiving a signal, comprising:

performing a constant modulus algorithm initialized using a first set of coefficients on the received signal to generate an equalized signal;

demodulating the equalized signal;

filtering the demodulated signal to detect a spurious signal and to generate an offset signal; and comparing the offset signal to a predetermined threshold, and if the offset signal satisfies a predetermined condition in relation to the predetermined threshold, then generating a second set of coefficients for re-initializing the constant modulus algorithm, wherein the second set of coefficients for the constant modulus algorithm are generated based on a frequency of the spurious signal and a set of coefficients related to a predetermined prototype filter.

16. The method of claim 15 further comprising determining a frequency of the spurious signal based on the offset signal.

17. The method of claim 15, wherein the predetermined condition comprises whether the offset signal exceeds the predetermined threshold.

18. The method of claim 17, wherein generating the second set of coefficients comprises using an equation, wherein the equation comprises:

$$\text{Coefficients}_{new} = \text{Coefficients}_{prototype} * e^{i*2\pi*(f_{spur} - f_{notch})/F_s * K}$$

wherein $\text{Coefficients}_{new}$ is the second set of coefficients, $\text{Coefficients}_{prototype}$ is the set of coefficients related to the predetermined prototype filter having a notch at a notch frequency of $f_{notch}$, $f_{spur}$ is the frequency of the spurious signal, $F_s$ is a sample frequency of the equalizer, and K is an array of integer numbers from 1 to a number of taps of the equalizer.

* * * * *